Aug. 11, 1959 A. J. WESOLOWSKI 2,899,573
COOLING ARRANGEMENT FOR SALIENT POLE ROTORS
Filed Aug. 21, 1957
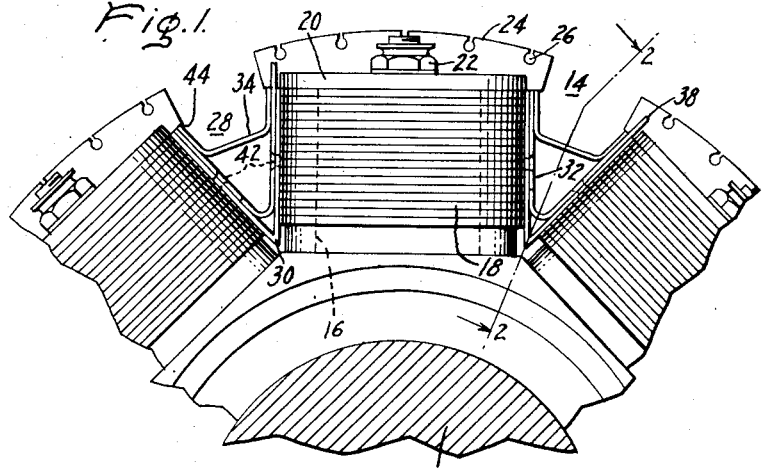
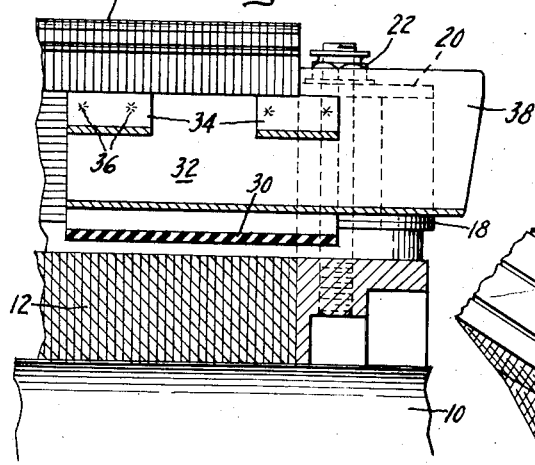
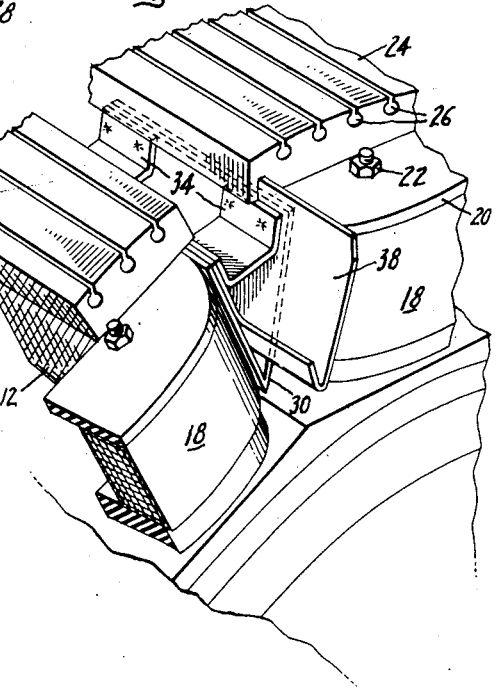
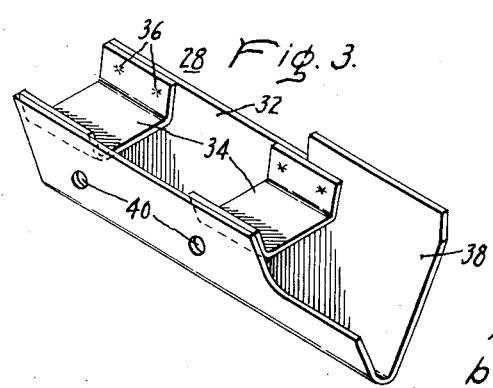
Inventor:
Adolph J. Wesolowski,
by James R Campbell
His Attorney.

United States Patent Office 2,899,573
Patented Aug. 11, 1959

2,899,573

COOLING ARRANGEMENT FOR SALIENT POLE ROTORS

Adolph John Wesolowski, Erie, Pa., assignor to General Electric Company, a corporation of New York Application August 21, 1957, Serial No. 679,481

3 Claims. (Cl. 310—60)

The invention described herein relates to a dynamoelectric machine and more particularly to a cooling arrangement for salient pole rotors in a synchronous machine.

During normal operation of small synchronous machines, heat is generated in the various pole pieces mounted on the peripheral surface of the rotor and if ventilating means are not provided to carry away the heat, serious reduction in the efficiency and power output of the machine results. Many different arrangements have been resorted to in the past in an attempt to maintain the rotor pole pieces at as low a temperature as possible commensurate with acceptable design practices, particularly in aircraft generators. An objection common to most prior art machines of this type is that dependence is placed entirely on rotor mounted fan blades to carry away the heat by convection. In doing so, the degree of cooling is tied directly to the efficiency of the fan blades and the volume of air that can conveniently be moved over the coils. Cooling problems of major importance usually are not encountered at sea level operation even though the ventilating apparatus may not be designed to its best advantage. To effect the maximum degree of cooling at high altitudes however, where the air is less dense, the same volume of air cannot be moved in heat exchange relationship with the pole pieces and undue heat with loss of efficiency of the machine necessarily results. Also, weight is a critical factor when the machine is mounted in an aircraft and the ventilating apparatus must therefore be designed with a minimum of weight and parts while concurrently performing a ventilating function with a maximum degree of efficiency.

Accordingly, the primary object of my invention is to eliminate the disadvantages cited above by providing an improved ventilating apparatus capable of equalizing the temperature gradients in the machine while simultaneously cooling heat producing parts with optimum efficiency.

Briefly stated, I carry out my invention by locating a triangular shaped wedge between adjacent poles of a salient pole rotor. The wedges are secured in intimate contact wtih facing sides of adjacent coils and are provided with a fan blade extension protruding outwardly from the rotor body which serves to pick up air during rotor rotation and pass it between the adjacent coil carrying pole pieces and in a direction axially of the machine. The heat generated during operation is therefore transmitted by conduction from the pole pieces into the triangular shaped wedge for distribution to the fan blades which are operating at a lower temperature. The ventilating air thus provided by the fan blades is caused to pass in heat exchange relationship with the triangular wedge thereby carrying away radiated heat by convection. As the fan blades rotate, a heat scrubbing action also occurs which carries away the heat normally flowing from the coils to the fan blades of lower temperature.

While the specification concludes with claims particularly pointing out and distinctly carrying out the subject matter which I regard as my invention, it is believed the invention will be better understood from the following description taken in connection with the accompanying drawing wherein:

Figure 1 is a view in elevation, partly in section, illustrating a combined wedge and fan blade mounted between adjacent poles on a salient pole rotor;

Figure 2 is a view taken on lines 2—2 of Figure 1;

Figure 3 is a perspective view of the combined wedge and fan blade located between the pole pieces in Figure 1; and Figure 4 is a perspective view of the apparatus illustrated in Figure 1.

Referring now to the drawings wherein like reference characters designate like or corresponding parts throughout the several views, there is shown a portion of a rotor for a synchronous machine comprising a shaft 10 having a plurality of laminations 12 secured to its outer surface upon which pole pieces 14 are mounted in the usual manner. The pole pieces have their magnetic bodies 16 formed integral with the laminations 12 and have coils 18 mounted thereon, as shown. A cap 20 secures the coils to the respective pole bodies by means of a bolt 22, and framing members 24 provided with openings 26 for amortisseur bars are also provided as is customary in the art.

In order to firmly position the pole pieces with respect to each other, a combined wedge and fan blade assembly 28 is located between adjacent poles and placed in intimate contact therewith as illustrated in Figures 1 and 4. Since a certain amount of vibration occurs during machine operation, an insulated spacer 30 is inserted between each of the wedges and the respective pole pieces for protecting the coil insulation from damage. The wedge consists of a triangular or V shaped member 32 having its free ends bridged by a plurality of spacers 34, each of which are tack-welded to the inner surface of the wedge sides as indicated at 36. One end of the wedge is equipped with a protruding portion 38 which serves as a fan blade circulating ventilating air between adjacent poles in the rotor. In order to anchor the wedge in position holes 40 are bored in the oppositely disposed sides for receiving screws 42 which firmly affixes these parts together. Alternatively, the wedge could also be attached between the poles by welding or otherwise securing the upper edges thereof to the member 24 for the amortisseur bars as indicated at 44.

*Operation*

In operation, with the combined wedge and fan blade 32 mounted between each of the pole pieces 14 and the rotor rotated, heat is generated in the pole pieces as a result of the electrodynamic cooperation between the various parts comprising the machine. Since the sides of the wedge are in intimate contact with the coils 18, heat is transferred thereto by conduction and flows to those areas of lower temperature, such as the fan blades 38. The fan blades are designed to create a suction on the air on the opposite side of the machine, thus developing a pressure differential thereacross which results in air flowing between the pole pieces and across the fan blades prior to spilling outwardly from the machine. As the air traverses the path provided between the pole pieces, the heat conducted to the wedge is radiated outwardly and is then carried by convection to an area outside the machine. Also, since the fan blades are in direct contact with the air, a scrubbing action occurs thus resulting in a transfer of heat from the blades by convection. Accordingly, an equalization of the temperature gradient normally appearing across a machine of this type is accomplished; namely, by conducting the heat losses along a low impedance path where it is radiated into the air stream created by the rotating fan blades.

In view of the above, it will be apparent that many modifications and variations are possible in light of the above teachings. For example, the wedges may be designed in a manner other than the specific triangular structure shown, so long as the sides of the wedge remain in intimate contact and in heat exchange relationship with the coils. Also, it would be obvious to those skilled in the art that the fan blades may be shaped in a manner to divert air in a direction opposite from that described above. Although the invention has been described in relation to aircraft alternators, it will be apparent that the teachings are equally applicable to all salient pole machines. It therefore is to be understood that within the scope of the appended claims, the invention may be practiced otherwise than as specifically described.

What I claim as new and desire to secure by Letters Patent of the United States is:

1. A rotor for a dynamoelectric machine having a plurality of spaced pole pieces including current carrying coils mounted on its outer peripheral surface, the improvement comprising a combined wedge and fan blade device positioned between each of said pole pieces and secured in intimate contact therewith so that heat generated in said pole pieces during rotor operation is conducted to said wedges and radiated outwardly therefrom, said fan blades being positioned outwardly in an axial direction from the rotor so as to cause air to pass in heat exchange relationship with said wedges and carry said radiated heat outwardly from said rotor by convection.

2. A rotor for a dynamoelectric machine having a plurality of spaced pole pieces including current carrying coils mounted on its outer peripheral surface, the improvement comprising a combined wedge and fan blade device positioned between each of said pole pieces and placed in intimate contact with a side of adjacent coils so as to collect heat conducted thereto from said pole pieces during rotor operation, a bridging member connecting opposite sides of each of said wedges for providing structural support to said pole pieces, said fan blades extending outwardly in an axial direction from said rotor for causing air to flow across the exposed surfaces of said wedges to carry radiated heat outwardly from said rotor.

3. A rotor for a dynamoelectric machine having a plurality of spaced pole pieces including current carrying coils mounted on its outer peripheral surface, the improvement comprising a combined wedge and fan blade device having sloping sides placed in intimate contact with each of the facing surfaces of adjacent pole pieces for collecting heat conducted therefrom during rotor operation, a bridging member connecting opposite sides of each said wedges for lending structural support to said pole pieces, said fan blade on each of said devices extending outwardly in an axial direction from said pole pieces for pumping air radially between said pole pieces to radially carry away heat imparted to said wedges during operation of said motor.

References Cited in the file of this patent

UNITED STATES PATENTS

| | | |
|---|---|---|
| 996,883 | Reist | July 4, 1911 |
| 1,030,041 | Williamson | June 18, 1912 |
| 1,504,145 | Rothenberger | Aug. 5, 1924 |